United States Patent
Uppara et al.

(10) Patent No.: US 12,252,073 B2
(45) Date of Patent: Mar. 18, 2025

(54) TRAILER UNDERNEATH AND SIDE VISUALIZATION

(71) Applicant: Continental Advanced Lidar Solutions US, LLC, Carpinteria, CA (US)

(72) Inventors: Ravikanth Uppara, Seaford (GB); Aranza Hinojosa Castro, Ferndale, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 471 days.

(21) Appl. No.: 17/753,355

(22) PCT Filed: Aug. 28, 2020

(86) PCT No.: PCT/US2020/048499
§ 371 (c)(1),
(2) Date: Feb. 28, 2022

(87) PCT Pub. No.: WO2021/041877
PCT Pub. Date: Mar. 4, 2021

(65) Prior Publication Data
US 2022/0314884 A1   Oct. 6, 2022

Related U.S. Application Data

(60) Provisional application No. 62/893,007, filed on Aug. 28, 2019.

(51) Int. Cl.
*B60R 1/10* (2006.01)
*B60R 1/00* (2022.01)
(Continued)

(52) U.S. Cl.
CPC .............. *B60R 1/105* (2013.01); *B60R 1/003* (2013.01); *B60R 1/26* (2022.01); *G08G 1/167* (2013.01); *B60R 2300/303* (2013.01)

(58) Field of Classification Search
CPC ........... B60R 1/105; B60R 1/003; B60R 1/00; B60R 1/26; G08G 1/167; G08G 1/168; H04N 7/183
See application file for complete search history.

(56) References Cited

U.S. PATENT DOCUMENTS

2007/0236364 A1   10/2007   Hubbard et al.
2017/0341583 A1   11/2017   Zhang et al.
(Continued)

OTHER PUBLICATIONS

The International Search Report and the Written Opinion of the International Searching Authority mailed on Nov. 18, 2020 for the counterpart PCT Application No. PCT/US2020/048499.

(Continued)

*Primary Examiner* — Ryan D Howard

(57) ABSTRACT

A method of providing a visualization (152) of one or more areas obscured by a trailer (200) attached to a vehicle (100) is provided. The method includes receiving first image data (133, 133a) from a first camera (132) positioned on a front portion of the vehicle (100) when the vehicle and the trailer are moving in a forward direction or a rear portion of the trailer when the vehicle and the trailer are moving in a rearward direction. The method also includes storing the received first image data. The method includes receiving speed data (135) of the vehicle from a speed sensor (134). The method also includes determining a visualization (152) of an area (Area 2) underneath the trailer (200) based on the stored first image data (133, 133a) and the speed data (135), and sending instructions to a display (122) to display the visualization of the area underneath the trailer.

16 Claims, 7 Drawing Sheets

(51) Int. Cl.
*B60R 1/26* (2022.01)
*G08G 1/16* (2006.01)

(56) References Cited

U.S. PATENT DOCUMENTS

| | | |
|---|---|---|
| 2018/0309918 A1 | 10/2018 | Ghannam et al. |
| 2019/0016382 A1 | 1/2019 | Zarco |
| 2019/0135216 A1 | 5/2019 | Church et al. |
| 2019/0279512 A1 | 9/2019 | Daniel |

OTHER PUBLICATIONS

EP Examination Report dated on Nov. 17, 2023 for counterpart European patent application 20 768 837.5.

TRAILER UNDERNEATH AND SIDE VISUALIZATION

TECHNICAL FIELD

This disclosure provides a trailer visualization method and system that provides a driver of a tow vehicle with a complete view through a trailer attached to the tow vehicle. The visualization includes areas behind the trailer, areas underneath the trailer, and areas on either side of the trailer.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used. In addition to the mechanical connection between the trailer and the powered vehicle, in some examples, the trailer is electrically connected to the tow vehicle. As such, the electrical connection allows the trailer to take the feed from the powered vehicle's rear light circuit, allowing the trailer to have taillights, turn signals, and brake lights that are in sync with the lights of the powered vehicle.

Some of the challenges that face tow vehicle drivers is maneuvering the vehicle-trailer system while having several blind-spots around the vehicle-trailer system. Therefore, it is desirable to have a system that provides the driver with a visualization of the blind-spot areas caused by the trailer being attached to the vehicle.

SUMMARY

One aspect of the disclosure provides a method of providing a visualization of one or more areas obscured by a trailer attached to a vehicle. The method includes receiving, at data processing hardware, first image data from a first camera positioned on a front portion of the vehicle when the vehicle and the trailer are moving in a forward direction. Alternatively, the camera may be positioned on a rear portion of the trailer when the vehicle and the trailer are moving in a rearward direction. The first camera is communication with the data processing hardware.

The method includes storing, at memory hardware in communication with the data processing hardware, the received first image data. The method includes receiving, at the data processing hardware, speed data of the vehicle from a speed sensor supported by the vehicle. In some examples, the speed data is also stored in memory. The method includes determining, at the data processing hardware, a visualization including an area underneath the trailer based on the stored first image data and the speed data. Finally, the method includes sending, from the data processing hardware to a display in communication with the data processing hardware, instructions to display the visualization including the area underneath the trailer.

Implementations of disclosure may include one or more of the following optional features. In some implementations, the method includes receiving second image data from a second camera positioned on a rear portion of the vehicle. The method also includes receiving third image data from a third camera positioned on a rear portion of the trailer and overlaying the third image data over the second image data. The visualization is displayed within a boundary of a representation of the trailer of the second image. In some examples, the method also includes stitching the first image data with the third image data as part of the visualization.

In some implementations, the method includes receiving fourth image data from a fourth camera positioned on a left-side and/or a right-side portion of the trailer and stitching the fourth image data with the third image data. The method also includes stitching the fourth image data with the first image data. The visualization includes the first image data, the third image data, and the fourth image data.

In some examples, the method includes determining a trailer angle between a vehicle fore-aft axis and a trailer fore-aft axis based on sensor system data received from a sensor system supported by a rear portion of the vehicle. The method also includes adjusting the visualization of the third image overlaid on the second image data based on the trailer angle.

Another aspect of the disclosure provides a system that includes data processing hardware and memory hardware in communication with the data processing hardware. The memory hardware stores instructions that when executed on the data processing hardware cause the data processing hardware to perform operations. These operations include the method described above.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a trailer hitch. Driving the vehicle-trailer system may be difficult due to one or more areas around and underneath the trailer that are obscure to the driver. Therefore, it is desirable to have a system that provides the driver with a complete visualization through the trailer including areas such as, behind the trailer, underneath the trailer, and the sides of the trailer by using sensor data from a sensor system.

Figure 1A:
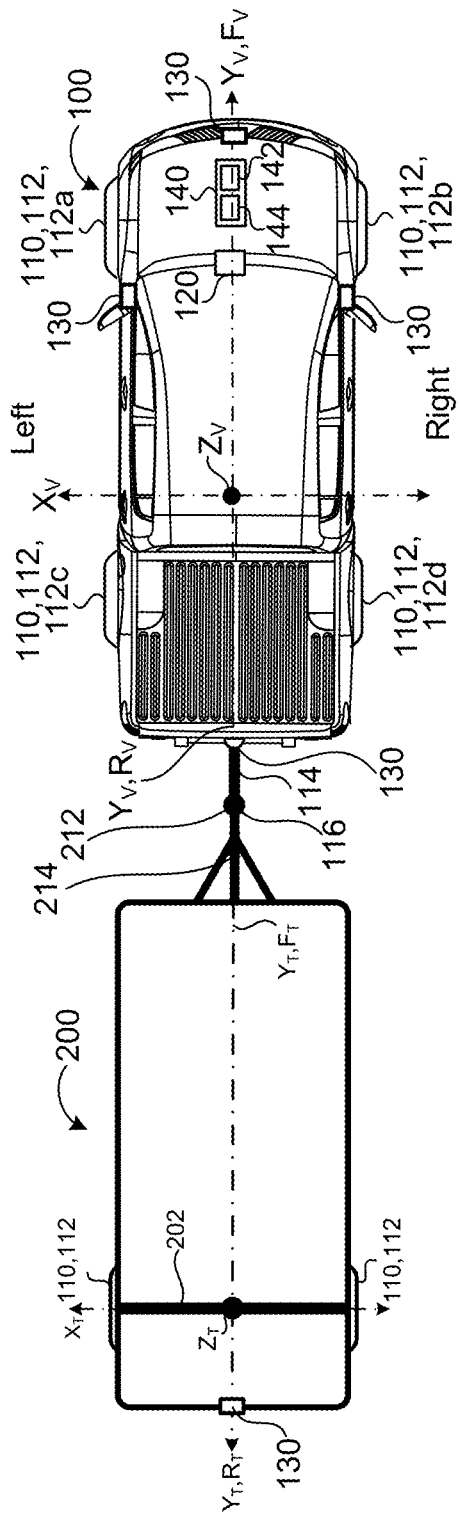
FIG. 1A is a top view of an exemplary tow vehicle towing a trailer.
Figure 1B:
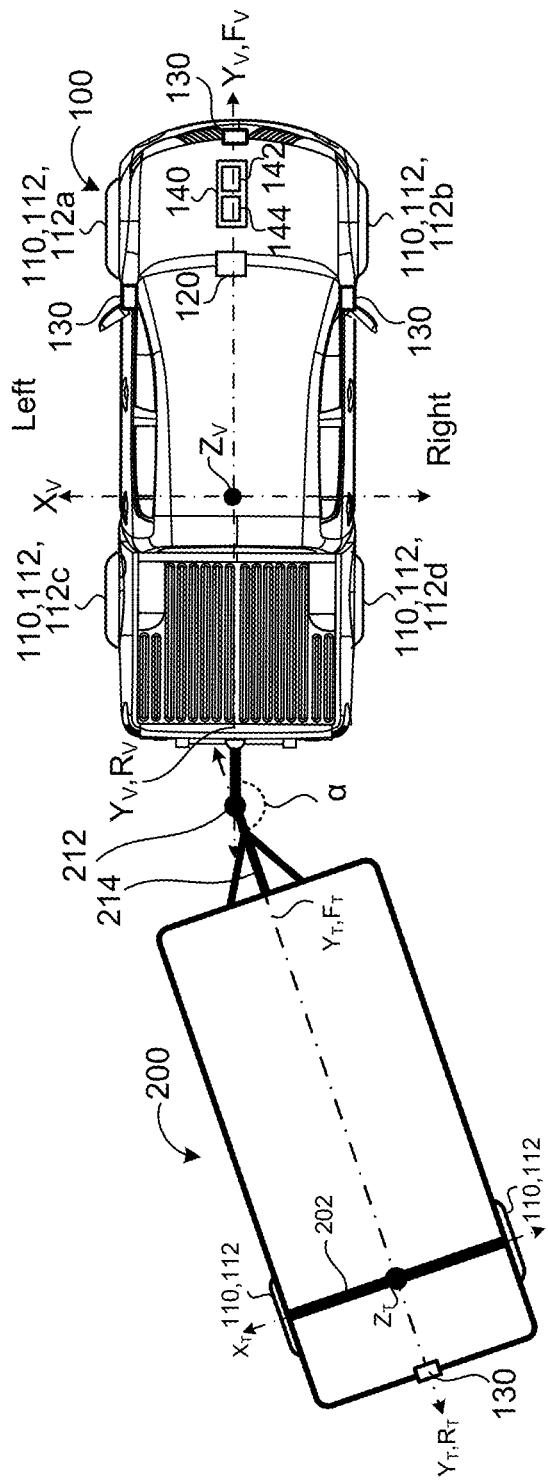
FIG. 1B is a top view of the exemplary tow vehicle towing the trailer of FIG. 1A at an angle.
Figure 2:
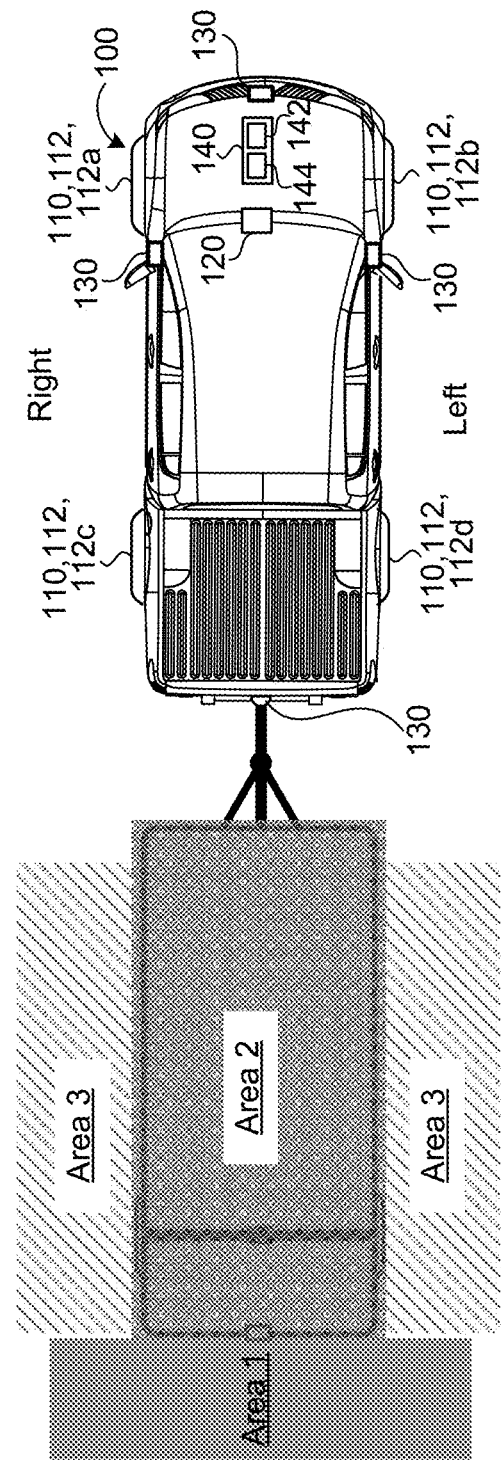
FIG. 2 is a top view of the obscure area from a driver perspective due of the exemplary tow vehicle towing the trailer of FIGS. 1A and 1B.

Referring to FIGS. 1A and 2, in some implementations, a driver of a tow vehicle 100 wants to tow a trailer 200 positioned behind the tow vehicle 100. The tow vehicle includes a vehicle tow ball 116 supported by a vehicle hitch bar 114. The vehicle tow ball 116 is coupled to a trailer hitch coupler 212 supported by a trailer hitch bar 214 of the trailer 200. The tow vehicle 100 may include a drive system 110 that maneuvers the tow vehicle 100 across a road surface based on drive commands having x, y, and z components, for example. As shown, the drive system 110 includes a front right wheel 112, 112a, a front left wheel 112, 112b, a rear right wheel 112, 112c, and a rear left wheel 112, 112d. The drive system 110 may include other wheel configurations as well. The drive system 110 may also include a brake system (not shown) that includes brakes associated with each wheel 112, 112a-d, and an acceleration system (not shown) that is configured to adjust a speed and direction of the tow vehicle 100. In addition, the drive system 110 may include a suspension system (not shown) that includes tires associates with each wheel 112, 112a-d, tire air, springs, shock absorbers, and linkages that connect the tow vehicle 100 to its wheels 112, 112a-d and allows relative motion between the tow vehicle 100 and the wheels 112, 112a-d.

The tow vehicle 100 may move across the road surface by various combinations of movements relative to three mutually perpendicular axes defined by the tow vehicle 100: a transverse axis $X_V$, a fore-aft axis $Y_V$, and a central vertical axis $Z_V$. The transverse axis $X_V$ extends between a right-side R and a left side of the tow vehicle 100. A forward drive direction along the fore-aft axis $Y_V$ is designated as $F_V$, also referred to as a forward motion. In addition, an aft or rearward drive direction along the fore-aft direction $Y_V$ is designated as $R_V$, also referred to as rearward motion. In some examples, the tow vehicle 100 includes a suspension system (not shown), which when adjusted causes the tow vehicle 100 to tilt about the $X_V$ axis and or the $Y_V$ axis, or move along the central vertical axis $Z_V$. As the tow vehicle 100 moves, the trailer 200 follows the tow vehicle 100. Therefore, when the tow vehicle 100 makes a turn as it moves in the forward direction $F_V$, then the trailer 200 follows along. While turning, the tow vehicle 100 and the trailer 200 form a trailer angle α.

Moreover, the trailer 200 follows the tow vehicle 100 across the road surface by various combinations of movements relative to three mutually perpendicular axes defined by the trailer 200: a trailer transverse axis $X_T$, a trailer fore-aft axis $Y_T$, and a trailer central vertical axis $Z_T$. The trailer transverse axis $X_T$ extends between a right side and a left side of the trailer 200 along a trailer turning axle 202. In some examples, the trailer 200 includes a front axle (not shown) and rear axle 202. In this case, the trailer transverse axis $X_T$ extends between a right side and a left side of the trailer 200 along a midpoint of the front and rear axle (i.e., a virtual turning axle). A forward drive direction along the trailer fore-aft axis $Y_T$ is designated as $F_T$, also referred to as a forward motion. In addition, a trailer aft or rearward drive direction along the fore-aft direction $Y_T$ is designated as $R_T$, also referred to as rearward motion. Therefore, movement of the vehicle-trailer system 100 includes movement of the tow vehicle 100 along its transverse axis $X_V$, fore-aft axis $Y_V$, and central vertical axis $Z_V$, and movement of the trailer 200 along its trailer transverse axis $X_T$, trailer fore-aft axis $Y_T$, and trailer central vertical axis $Z_T$. Therefore, when the tow vehicle 100 makes a turn as it moves in the forward direction $F_V$, then the trailer 200 follows along. While turning, the tow vehicle 100 and the trailer 200 form the trailer angle α being an angle between the vehicle fore-aft axis $Y_V$ and the trailer fore-aft axis $Y_T$.

The tow vehicle 100 may include a user interface 120. The user interface 120 may include a display 122, a knob, and a button, which are used as input mechanisms. In some examples, the display 122 may show the knob and the button. While in other examples, the knob and the button are a knob button combination. In some examples, the user interface 120 receives one or more driver commands from the driver via one or more input mechanisms or a touch screen display 122 and/or displays one or more notifications to the driver. The user interface 120 is in communication with a vehicle controller 140. In some examples, the display 122 displays an image 133 of an environment of the tow vehicle 100 which includes the blind-spot visualization 152 including Areas 1-3 (shown in FIG. 2).

The tow vehicle 100 may include a sensor system 130 to provide reliable and robust driving. The sensor system 130 may include different types of sensors that may be used separately or with one another to create a perception of the environment of the tow vehicle 100 and the trailer 200 that is used for the tow vehicle 100 to drive and aid the driver in make intelligent decisions based on objects and obstacles detected by the sensor system 130. The sensor system 130 may include the one or more cameras 132 supported by the tow vehicle 100 and the trailer 200. In some implementations, the tow vehicle 100 includes a front camera 132 that is mounted to provide a view of a front-driving path for the tow vehicle 100. Additionally, the tow vehicle 100 may include a rear camera 132 that is mounted to provide a view of a rear-driving path for the tow vehicle 100. The tow vehicle 100 may also include side cameras 132 positioned on the left and right side of the tow vehicle 100 to provide a side-views of the tow vehicle 100 and the trailer 200. Moreover, the sensor system 130 also includes a camera 132 positioned on a rear portion of the trailer 200 to provide a view of the rear-driving path of the trailer 200 when attached and following the tow vehicle 100.

The sensor system 130 may also include other sensors 134 that detect the vehicle motion, i.e., speed, angular speed, position, etc. The other sensors 134 may include an inertial measurement unit (IMU) configured to measure the vehicle's linear acceleration (using one or more accelerometers) and rotational rate (using one or more gyroscopes). In some examples, the IMU also determines a heading reference of the tow vehicle 100. Therefore, the IMU determines the pitch, roll, and yaw of the tow vehicle 100. The other sensors 134 may include, but are not limited to, radar, sonar, LIDAR (Light Detection and Ranging, which can entail optical remote sensing that measures properties of scattered light to find range and/or other information of a distant target), LADAR (Laser Detection and Ranging), ultrasonic, HFL (High Resolution 3D Flash LIDAR), etc.

The tow vehicle 100 also includes the vehicle controller 140. The vehicle controller 140 includes a computing device (or processor) 142 (e.g., central processing unit having one or more computing processors) in communication with non-transitory memory 144 (e.g., a hard disk, flash memory, random-access memory) capable of storing instructions executable on the computing processor(s) 142. In some examples, the vehicle controller 140 executes a visualization system 150 that provides the driver of the tow vehicle 100 with a complete visualization 152 through the attached trailer 200. In other words, the visualization 152 provides the driver with an appearance that the trailer is transparent and thus allows the driver to see behind and underneath the trailer 200.

The visualization system 150 receives sensor system data 131 from the sensor system 130 and provides blind-spot visualization 152 of the vehicle-trailer environment which includes areas behind (Area 1) the trailer 200, areas underneath (Area 2) the trailer 200, and areas on either side (Areas 3) of the trailer 200 based on the received sensor system data 131. When the trailer 200 is connected to the vehicle 100, three areas (Area 1, Area 2, Area 3) within the environment of the trailer 200 are obscure to the driver, as shown in FIG. 2. Therefore, the visualization system 150 provides a solution to visualize these obscured areas by using the images/image data 133, 133a-d from surround view cameras 132 positioned on the vehicle 100 and the rear portion of the trailer 200. In some examples, the vehicle controller 140 determines the trailer angle α based on the sensor data 131. In this case, the visualization system 150 determines or updates the visualization 152 based on the trailer α. The visualization system 150 receives sensor data 131 from the one or more cameras 132 and/or one or more sensors 134 to provide a trailer visualization 152 as shown in FIG. 4.

Figure 3:
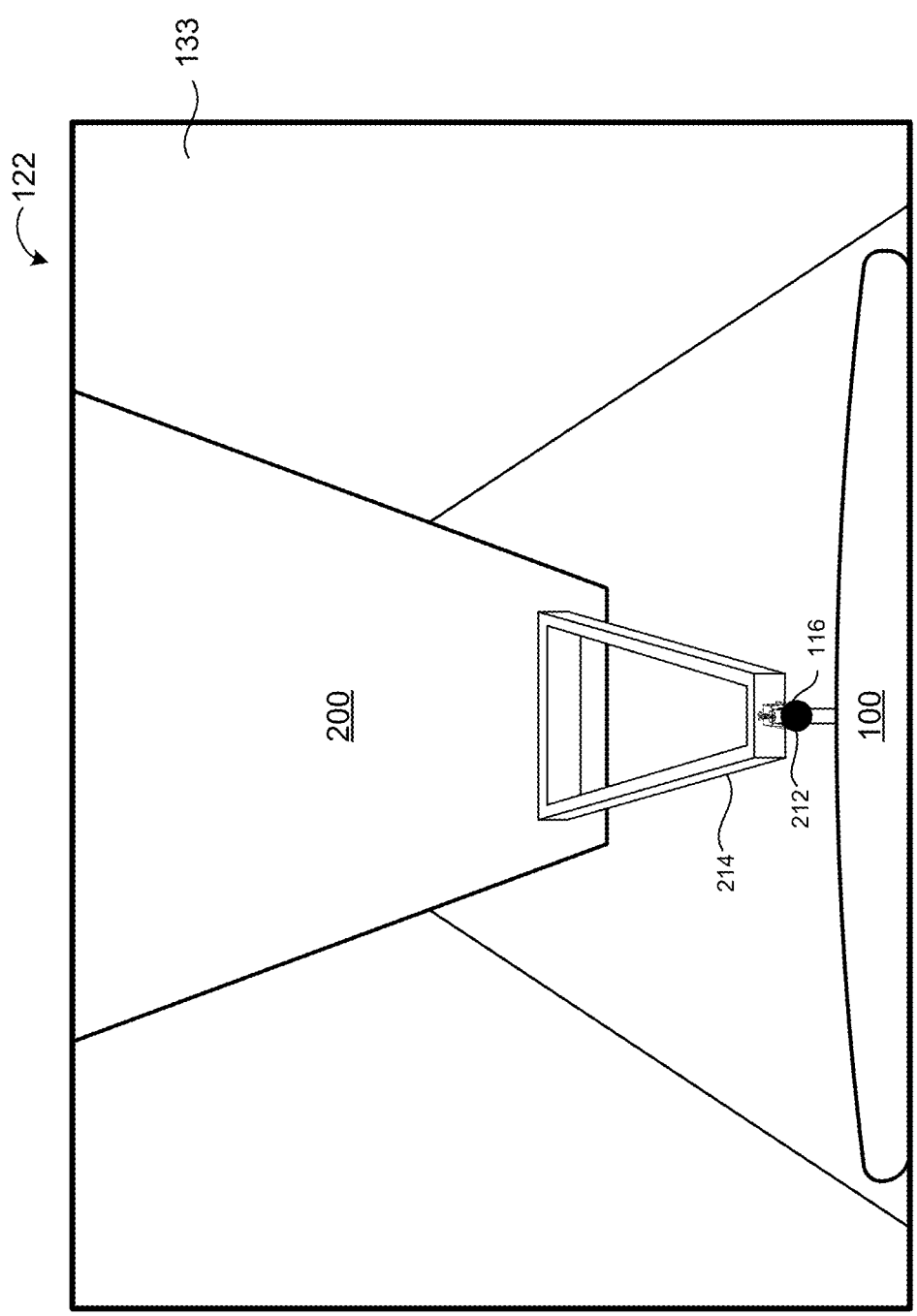
FIG. 3 is a perspective view of an image of the trailer captured by a camera positioned on a rear portion of the vehicle.
Figure 4:
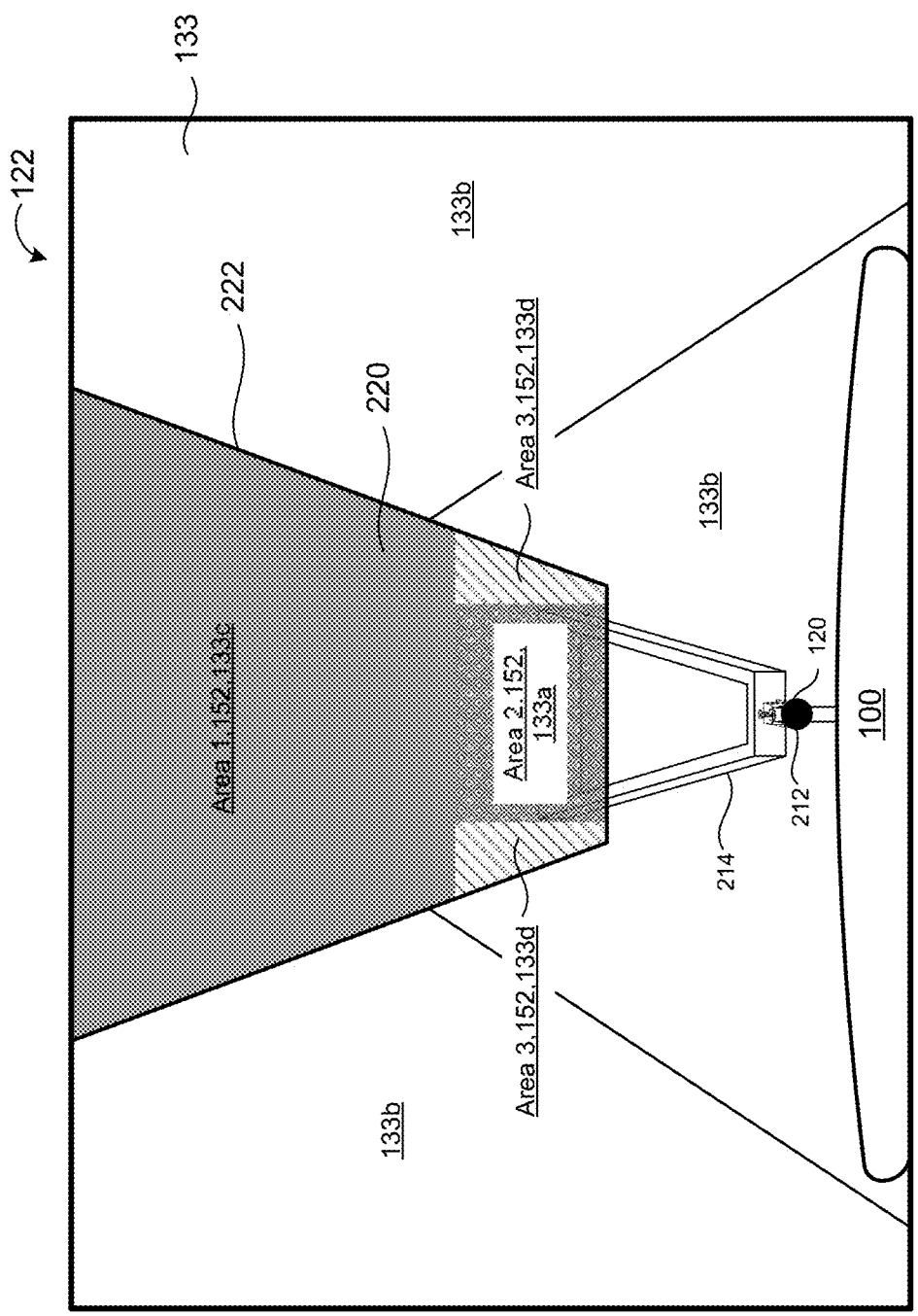
FIG. 4 is a perspective view of an exemplary visualization overlain on the image shown in FIG. 3 of the obscure areas causes by the trailer.

In some examples, the visualization system 150 receives images from one or more cameras 132 positioned on a rear portion of the trailer 200 and stiches these images with images 133 from one or more camera 132 positioned on the rear portion of the vehicle 100 to generate a visualization 152 that includes an image 133, 133b of a rearward environment of the vehicle 100 (FIG. 3) with a visual of Area 1 as shown in FIG. 4. Therefore, the driver can see through the trailer 200 since the visualization system 150 overlays the image 133, 133c captured by the camera(s) 132 positioned on the rear of the trailer 200 (Area 1) with the image 133, 133b captured by the camera(s) 132 positioned on the rear of the vehicle 100. In some examples, the image 133, 133c of the rear environment of the trailer 200 is displayed within the boundaries 222 of the trailer 200 to give a perception that the trailer 200 is transparent as shown in FIG. 4. In some examples, the visualization system 150 blends or overlays the images 133, 133c from camera(s) 132 positioned on the rear of the trailer 200 and images 133, 133d from camera(s) 132 positioned on the rear of the vehicle 100 with consideration of the trailer angle α with respect to the vehicle 100.

While the vehicle 100 and the trailer 200 are moving in the forward direction F, the one or more cameras 132 positioned on the front of the vehicle 100 capture images 133, 133a and store the images 133, 133a in memory 144. In this case, the visualization system 150 retrieves the stored images 133, 133a and determines a visualization 152 for Area 2 (underneath the trailer 200) while the vehicle 100 and the trailer 200 are moving in the forward direction F.

While the vehicle 100 and the trailer 200 are moving in the rearward direction R, the one or more cameras 132 positioned on the rear of the trailer 200 capture images 133, 133a and store the images in memory 144. In this case, the visualization system 150 retrieves the stored images 133, 133a and determines a visualization 152 for Area 2 (underneath the trailer 200) while the vehicle 100 and trailer 200 are moving in the rearward direction R.

Additionally, in some examples, during both forward and rearward direction of the vehicle 100 and trailer 200, the sensors 134 capture sensor data 135 such as vehicle speed data from a vehicle speed sensor, vehicle distance travelled data, the trailer angle α or any other sensor described above. Therefore, the visualization system 150 determines the visualization of Area 2 based on images 133 and sensor data 135.

As for the sides of the trailer 200 (Area 3), the visualization system 150 receives images 133, 133d from camera(s) 132 positioned on the left side of the vehicle 100 and right side of the vehicle 100 and generates a visualization 152 of Area 3 based on the received images 133, 133d. In some examples, the visualization system 150 stiches the images 133, 133d received from the right/side of the vehicle 100 with the visualization of Area 2 and the visualization of Area 1. The visualization system 150 may generate a standard top view based on the image data 133d captures from the side cameras 132 and the image data 133c captured by the trailer rear camera 132.

In some examples, the visualization system 150 receives data or calculates the mounting position of a camera 132 with reference to a vehicle axle center (not shown) on the ground. In some examples, when stitching image data 133 from different cameras 132, the visualization system 150 considers the mounting position of the cameras 132 to provide a seamless alignment of the visualization 152 that include the stitched image data 133. In some examples, by knowing the mounting position of each camera 132 with reference to the vehicle axle and the vehicle speed (from a speed sensor), the visualization system 150 can determine a traveled distance and can identify a region of interest within the captured image data 133 that are used for the visualization 152.

Therefore, as shown in FIG. 4, the image 133 (FIG. 3) captured by the camera 132 positioned on the back of the vehicle 100 is first displayed. Then the visualization 152 of Areas 1, 2, and 3 are overlain on the captured image of FIG. 3 resulting in the image shown in FIG. 4. The visualization 152 includes stitching of Areas 1, 2, and 3, which is also stitched to the image data 133, 133b captured from the rear vehicle camera 132. As the tow vehicle 100 and the trailer 200 move (in the forward or rearward direction), the visualization 152 is updated based on the received images 133 and based on the trailer angle α.

Figure 5:
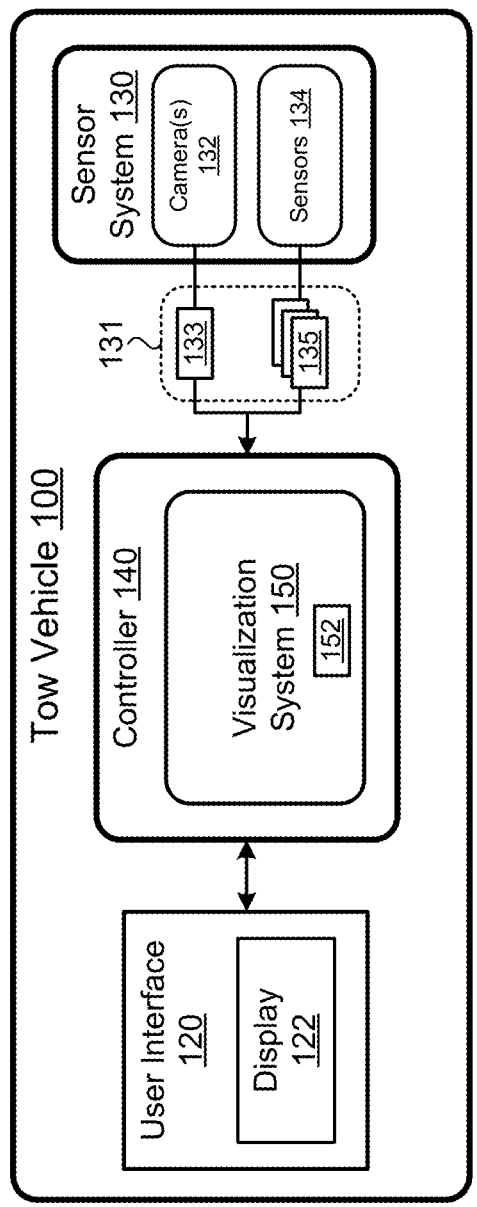
FIG. 5 is a schematic view of the exemplary tow vehicle of FIG. 1A.
Figure 6:
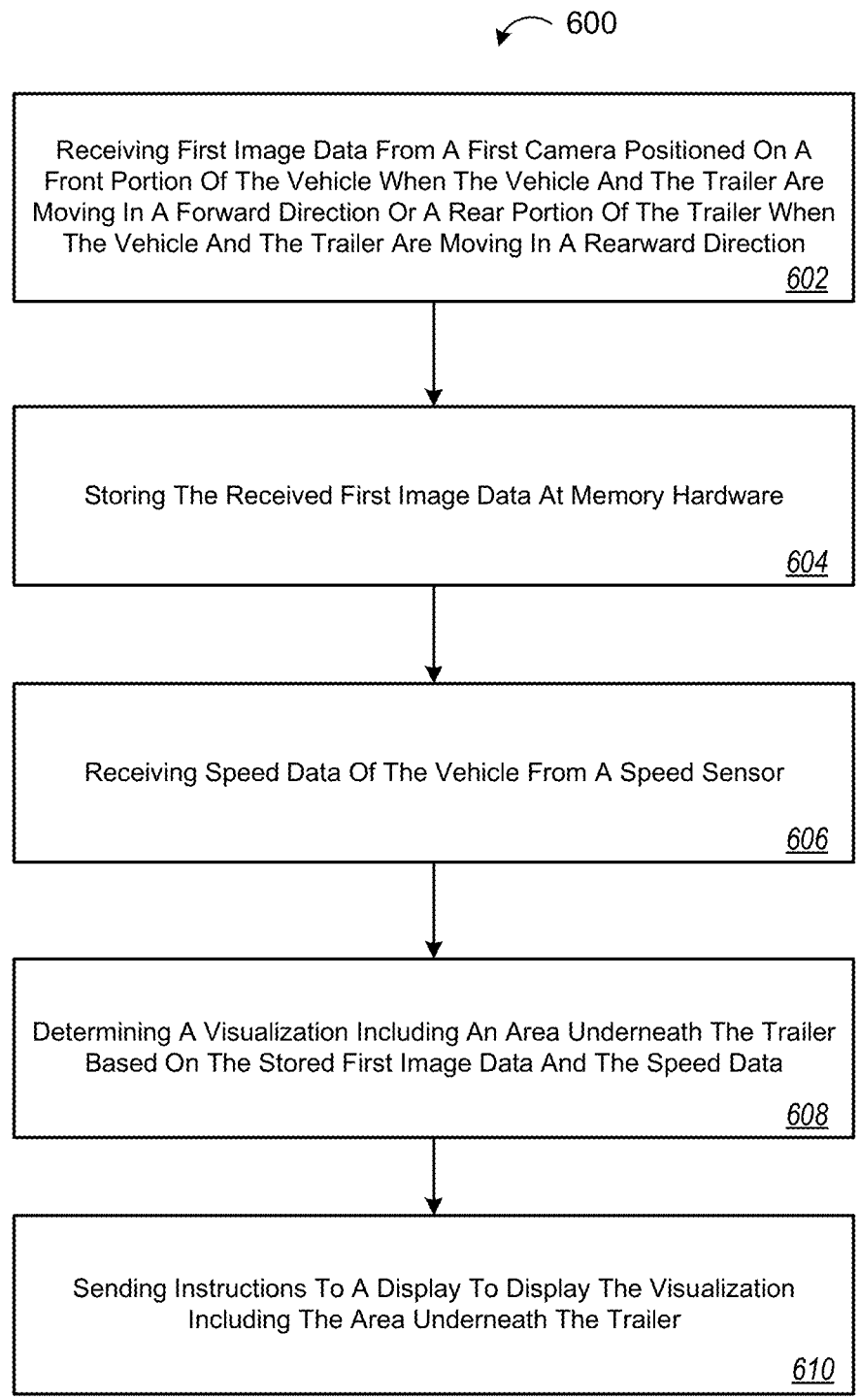
FIG. 6 is a schematic view of an exemplary arrangement of operations for a method that generates a visualization of a trailer environment.

FIG. 5 provides an example arrangement of operations for a method 600 of providing a visualization 152 of one or more areas obscured by a trailer 200 attached to a vehicle 100 using the system of FIGS. 1A-5. At block 602, the method 600 includes receiving, at data processing hardware 140, first image data 133, 133a from a first camera 132 positioned on a front portion of the vehicle 100 when the vehicle 100 and the trailer 200 are moving in a forward direction $F_V$, $F_T$. Alternatively, the camera 132 may be positioned on a rear portion of the trailer 200 when the vehicle 100 and the trailer 200 are moving in a rearward direction $R_V$, $R_T$. The first camera 132 is communication with the data processing hardware 140.

At block 604, the method 600 includes storing, at memory hardware 144 in communication with the data processing hardware 140, the received first image data 133, 133a. At block 606, the method 600 includes receiving, at the data processing hardware 140, speed data 135 of the vehicle 100 from a speed sensor 134 supported by the vehicle 100. In some examples, the speed data 135 is also stored in memory 144. At block 608, the method 600 includes determining, at the data processing hardware 140, a visualization 152 including an area (Area 2) underneath the trailer 200 based on the stored first image data 133,133a and the speed data 135. Finally, at block 610, the method 600 includes sending, from the data processing hardware 140 to a display 122 in communication with the data processing hardware 140, instructions to display the visualization 152 including the Area 2 underneath the trailer 200.

In some implementations, the method 600 also includes receiving second image data 133b from a second camera 132 positioned on a rear portion of the vehicle 100. The method 600 also includes receiving third image data 133c from a third camera 132 positioned on a rear portion of the trailer 200 and overlaying the third image data 133c over the second image data 133b). The visualization 152 is displayed within a boundary 222 of a representation 220 of the trailer 200 of the second image 133b. In some examples, the method 600 also includes stitching the first image data 133a with the third image data 133c as part of the visualization 152.

In some implementations, the method 600 includes receiving fourth image data 133d from a fourth camera 132 positioned on a left-side and/or a right-side portion of the trailer 200 and stitching the fourth image data 133d with the third image data 133c. The method also includes stitching the fourth image data 133d with the first image data 133a. The visualization 152 includes the first image data 133a, the third image data (133c), and the fourth image data 133d.

In some examples, the method 600 includes determining a trailer angle α between a vehicle fore-aft axis $Y_V$ and a trailer fore-aft axis $Y_T$ based on sensor system data 131 received from a sensor system 130 supported by a rear portion of the vehicle 100. The method 600 also includes adjusting the visualization 152 of the third image 133c overlaid on the second image data 133b based on the trailer angle α.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method of providing a visualization of one or more areas obscured by a trailer attached to a vehicle, the method comprising:
   receiving, at data processing hardware, first image data from a first camera positioned on a front portion of the vehicle when the vehicle and the trailer are moving in a forward direction or a rear portion of the trailer when the vehicle and the trailer are moving in a rearward direction, the first camera in communication with the data processing hardware;
   storing, at memory hardware in communication with the data processing hardware, the received first image data;
   receiving, at the data processing hardware, speed data of the vehicle from a speed sensor;
   determining, at the data processing hardware, a visualization including an area underneath the trailer based on the stored first image data and the speed data; and
   sending, from the data processing hardware to a display in communication with the data processing hardware, instructions to display the visualization including the area underneath the trailer.

2. The method of claim 1, further comprising:
   receiving second image data from a second camera positioned on a rear portion of the vehicle;
   receiving third image data from a third camera positioned on a rear portion of the trailer; and
   overlaying the third image data over the second image data.

3. The method of claim 2, wherein the visualization is displayed within a boundary of a representation of the trailer of the second image.

4. The method of claim 3, further comprising:
stitching the first image data with the third image data as part of the visualization.

5. The method of claim 3, further comprising:
receiving fourth image data from a fourth camera positioned on a left-side and/or a right-side portion of the trailer; and
stitching the fourth image data with the third image data.

6. The method of claim 5, further comprising stitching the fourth image data with the first image data.

7. The method of claim 5, wherein the visualization includes the first image data, the third image data, and the fourth image data.

8. The method of claim 3, further comprising:
determining a trailer angle between a vehicle fore-aft axis and a trailer fore-aft axis based on sensor system data received from a sensor system supported by a rear portion of the vehicle; and
adjusting the visualization of the third image overlaid on the second image data based on the trailer angle.

9. A system for providing a visualization of one or more areas obscured by a trailer attached to a vehicle, the system comprising:
data processing hardware;
memory hardware in communication with the data processing hardware, the memory hardware storing instructions that when executed on the data processing hardware cause the data processing hardware to perform operations comprising:
receiving first image data from a first camera positioned on a front portion of the vehicle when the vehicle and the trailer are moving in a forward direction or a rear portion of the trailer when the vehicle and the trailer are moving in a rearward direction, the first camera in communication with the data processing hardware;
storing the received first image data at the memory hardware;
receiving speed data of the vehicle from a speed sensor;
determining a visualization including an area underneath the trailer based on the stored first image data and the speed data; and
sending instructions to a display to display the visualization including the area underneath the trailer.

10. The system of claim 9, wherein the operations further comprise:
receiving second image data from a second camera positioned on a rear portion of the vehicle;
receiving third image data from a third camera positioned on a rear portion of the trailer; and
overlaying the third image data over the second image data.

11. The system of claim 10, wherein the visualization is displayed within a boundary of a representation of the trailer of the second image.

12. The system of claim 11, wherein the operations further comprise:
stitching the first image data with the third image data as part of the visualization.

13. The system of claim 11, wherein the operations further comprise:
receiving fourth image data from a fourth camera positioned on a left-side and/or a right-side portion of the trailer; and
stitching the fourth image data with the third image data.

14. The system of claim 13, wherein the operations further comprise stitching the fourth image data with the first image data.

15. The system of claim 13, wherein the visualization includes the first image data, the third image data, and the fourth image data.

16. The system of claim 11, wherein the operations further comprise:
determining a trailer angle between a vehicle fore-aft axis and a trailer fore-aft axis based on sensor system data received from a sensor system supported by a rear portion of the vehicle; and
adjusting the visualization of the third image overlaid on the second image data based on the trailer angle.

* * * * *